Dec. 8, 1936.    G. E. STANLEY    2,063,203
PRESSER PLATE FOR CLUTCHES
Filed Jan. 12, 1935    2 Sheets-Sheet 1

Inventor
George E. Stanley
by Mawhinney & Mawhinney
Attorneys.

Dec. 8, 1936.  G. E. STANLEY  2,063,203
PRESSER PLATE FOR CLUTCHES
Filed Jan. 12, 1935  2 Sheets—Sheet 2

Inventor
George E. Stanley
by Mawhinney & Mawhinney
Attorneys.

Patented Dec. 8, 1936

2,063,203

UNITED STATES PATENT OFFICE 2,063,203

PRESSER-PLATE FOR CLUTCHES

George Enoch Stanley, Coventry, England

Application January 12, 1935, Serial No. 1,560
In Great Britain January 16, 1934

5 Claims. (Cl. 192—68)

This invention relates to clutches such as have presser-plates which, or the operative portion of which—i. e., that part which contacts with the driven clutch disc—is flexibly supported from the driving member of the clutch, preferably being resiliently supported therefrom. The invention relates particularly to disc clutches for motor-vehicles, the main object being to provide an improved presser-plate and method of supporting its operative surface by which it will tend to remain in perfect balance and with which difficulties arising from distortion or sticking of the clutch disc or presser-plate will be prevented. Furthermore, by means of the invention the possibility of local heating causing distortion either of the operative surface of the presser-plate or of the clutch-engaging springs can be reduced.

The present invention involves two main features. One is that means is arranged lightly to bias the operative portion of the presser-plate in the disengaging direction, and the operative portion is not positively withdrawn but disengagement of the clutch is effected by the removal of the main engaging bias, such as may be supplied by ordinary clutch-engaging springs acting on the operative surface of the presser-plate. The other feature, and this is possibly more important than the first, is that the operative surface of the presser-plate comprises independent sections resiliently supported from the driving member of the clutch. Preferably these independent sections are annularly arranged and individually supported from the driving member of the clutch through resilient means biasing them in the disengaging direction, thus embodying both the features of the invention and providing an almost ideal clutch operation.

In the accompanying drawings:—

Figure 1:
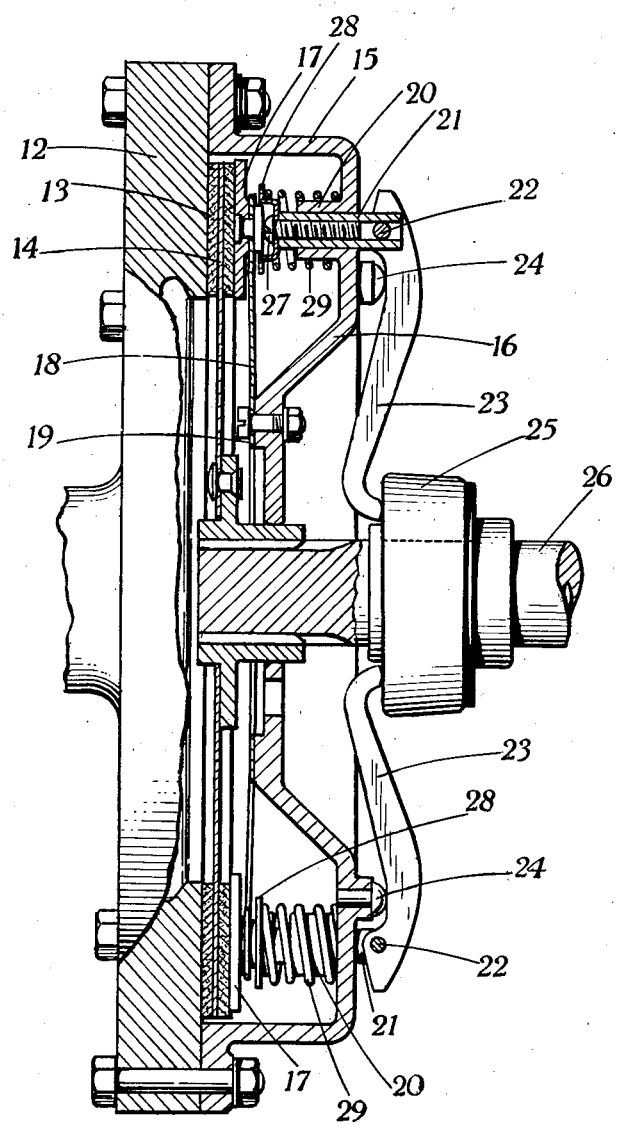
Figure 2:
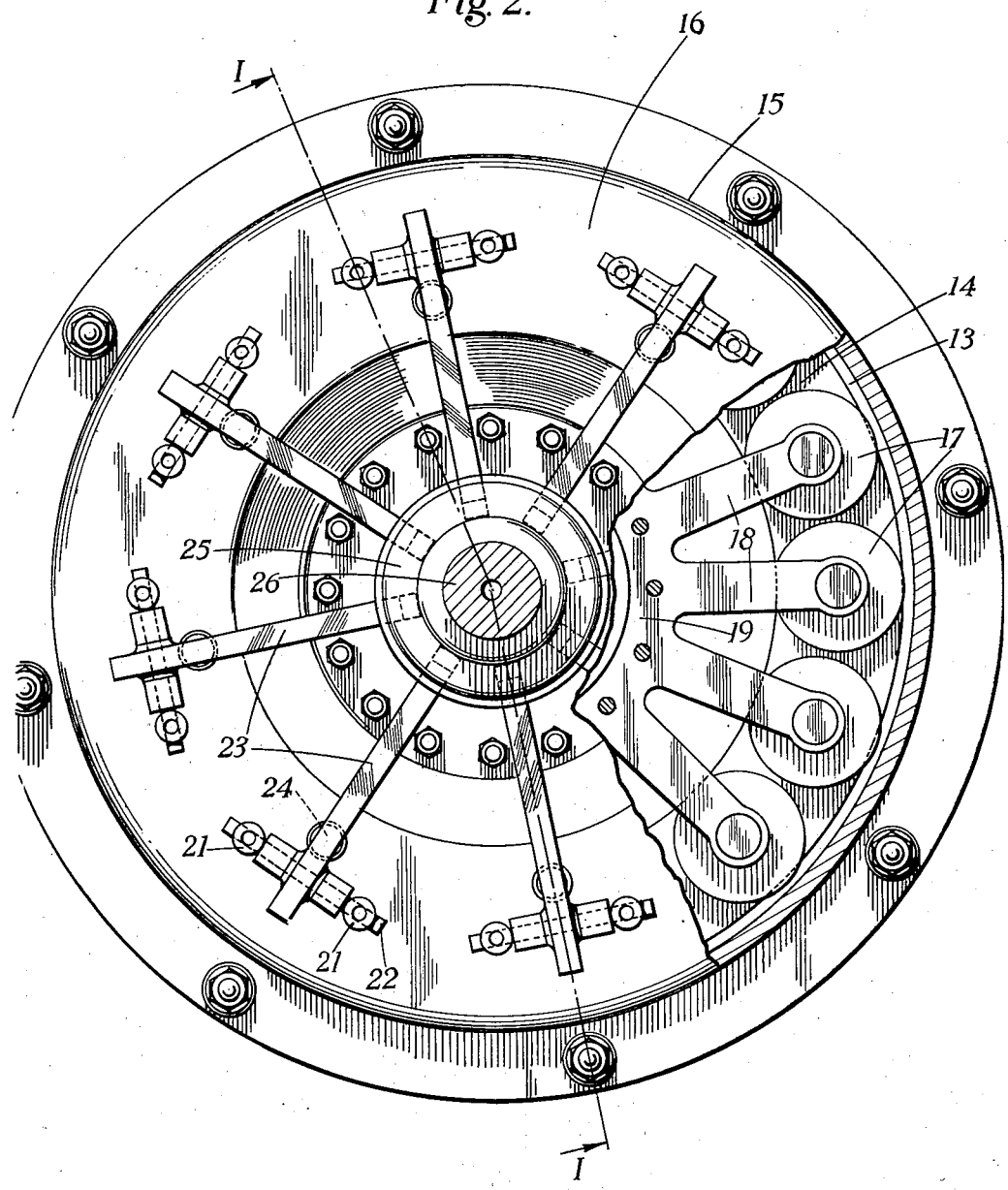

Figure 1 is a sectional elevation, taken on the line I—I of Figure 2 of a clutch according to the invention; and Figure 2 is an end elevation, taken from the right of Figure 1, with a part of the driving flange broken away.

In the construction illustrated, as applied to a single-plate disc clutch for a motor-vehicle, the flywheel 12 is formed in a known manner with a rear friction face 13 which lies adjacent to the driven clutch disc 14, and, in addition, the flywheel has bolted to it a casing 15 which is conveniently formed of aluminium and has an inwardly-extending flange 16 spaced well clear of the rear face of the driven clutch disc. The flange serves for supporting the presser-plate the operative portion of which comprises a number of independent annularly-arranged sections 17. They may be of steel or other material and they are here shown in the form of circular discs. They may be of or lined with impregnated fabric when the adjacent face of the driven clutch plate is naked.

In a preferred arrangement the supporting of the presser-plate sections is effected by means of radially-arranged spring fingers 18, the inner ends of which are bolted or otherwise rigidly secured to the inner edge of the flange 16, whilst their outer ends are riveted or otherwise rigidly engaged with the sections. These spring fingers may be initially dished or otherwise arranged lightly to bias the sections away from the driven clutch disc. The drawings show the fingers as being united to each other at their inner ends by the ring 19.

Through the holes of bosses 20 formed in the flange 16 are arranged pegs 21, 21 the outer ends of which are hinged at 22 to operating levers 23, 23 fulcrumed on appropriate parts 24 provided externally of the flange. The inner ends of the levers are engaged, in a well understood manner, with a clutch withdrawal ring 25 arranged upon the driven shaft 26. The inner ends of the pegs are headed, at 27, to engage the outer ends of the spring fingers—for example, to engage the heads of rivets by which the spring fingers are secured to the individual presser-plate sections, and each of the heads carries a flanged washer 28 which receives a coil spring 29 disposed round the boss and biasing the peg inwardly and therefore the adjacent section of the presser-plate in clutch-engaging direction. Thus, when the clutch is to be withdrawn the pegs are pulled out against the main springs 29 allowing the presser-plate sections to move clear of the driven clutch disc under the inherent bias of the spring arms 18.

For a medium-sized car clutch there may be, say, sixteen presser-plate sections 17, sixteen spring fingers 18 and sixteen pegs 21, and eight operating levers 23, these latter either being of twin formation or connected to two adjacent pegs as shown clearly in Figure 2.

The operative portion (or sections 17) of the presser-plate, being flexibly supported from the driving portion of the clutch, is not subjected to any sliding movement and there is, therefore, no need for working clearances which would tend to allow the operative portion to run slightly eccentrically. Not only can very good balance be obtained in consequence, but, in the absence of sliding of the operative portion of the presser-plate, sticking is avoided. The parts being rigidly secured to one another, no rattle can take place.

The sections 17, when built up as described, render the operative portion of the presser-plate flexible so that it can adapt itself to different conditions and by this means local heating with consequent distortion is avoided. Some of the heat generated is passed to the pegs 21 and thence to the flange 16, some is passed to the flange along the spring fingers 18, and the main springs 29, 29, being out of the normal path of travel of the heat, are not liable to become overheated and thus to lose their resiliency.

What I claim as my invention and desire to secure by Letters Patent of the United States is:—

1. For a clutch, a driving member, a presser-plate formed of independent sections, a casing carried by the driving member and enclosing the presser-plate, and a multi-finger spring the arms of which individually support said sections from the said casing.

2. In a clutch, a driving member having an inwardly-extending flange, a presser-plate comprising independent sections, and radially-arranged spring fingers rigidly secured to the flange and also to said independent sections, respectively.

3. A clutch comprising a driving member, a driving casing rigidly secured thereto, a driven disc, a presser plate, resilient means carried by said driving casing and flexibly supporting the presser plate and biasing it lightly in disengaging direction, stronger means biasing the presser plate in the engaging direction, bosses on said driving casing supporting said stronger means, and means connected with said stronger means but not with the presser plate for withdrawing said stronger means to allow of the disengagement of the presser plate solely by said resilient means.

4. In a clutch, a driving member, a presser plate, a resilient spider supported at the inner ends of its arms from the driving member said spider flexibly supporting the presser plate at the outer ends of its arms, said spider lightly biasing the presser plate in the disengaging direction, resilient means biasing the presser plate in the engaging direction, and means connected with said resilient means but not with said presser plate for withdrawing said resilient means to allow of the disengagement of said presser plate solely by said spider.

5. In a clutch, a driving member, a driving casing rigidly supported thereby, a driven disc, a presser plate adapted to clamp the driven disc against the driving member, the presser plate comprising a number of independent sections adapted to engage against the driven disc, and a resilient spider carried by the driving casing and supporting the independent sections, said spider acting to lightly bias said sections away from the driven disc.

GEORGE ENOCH STANLEY